(12) United States Patent
Leyland et al.

(10) Patent No.: US 7,403,319 B2
(45) Date of Patent: Jul. 22, 2008

(54) ELECTROCHROMIC DEVICE EMPLOYING GEL OR SOLID POLYMERS HAVING SPECIFIC CHANNEL DIRECTION FOR THE CONDUCTION OF IONS

(75) Inventors: Nigel Leyland, Dublin (IE); David Corr, Dublin (IE); Micheal Cassidy, Dublin (IE); Francois Pichot, Dublin (IE); Nikolaos Vlachopoulos, Dublin (IE); Michael Ryan, Dublin (IE)

(73) Assignee: NTERA Limited, Dublin (IE)

( * ) Notice: Subject to any disclaimer, the term of this patent is extended or adjusted under 35 U.S.C. 154(b) by 13 days.

(21) Appl. No.: 11/622,751

(22) Filed: Jan. 12, 2007

(65) Prior Publication Data

US 2007/0182705 A1 Aug. 9, 2007

Related U.S. Application Data

(60) Provisional application No. 60/759,248, filed on Jan. 13, 2006, provisional application No. 60/759,256, filed on Jan. 13, 2006, provisional application No. 60/759,249, filed on Jan. 13, 2006, provisional application No. 60/759,251, filed on Jan. 13, 2006.

(51) Int. Cl.
*G02F 1/153* (2006.01)
*G02F 1/15* (2006.01)
*G09G 3/38* (2006.01)

(52) U.S. Cl. .................... 359/268; 359/265; 359/267; 359/270; 345/105

(58) Field of Classification Search ........... 349/105, 349/107; 359/265, 266, 267, 268, 269, 270, 359/271
See application file for complete search history.

(56) References Cited

U.S. PATENT DOCUMENTS

| 4,184,751 | A | 1/1980 | Nicholson |
| 4,205,903 | A | 6/1980 | Inami et al. |
| 4,331,385 | A | 5/1982 | Kondo et al. |
| 4,977,007 | A | 12/1990 | Kondo et al. |
| 5,049,868 | A | 9/1991 | Green et al. |
| 5,714,247 | A | 2/1998 | Kuo et al. |
| 5,774,255 | A | 6/1998 | Howard |
| 6,144,429 | A | 11/2000 | Nakai et al. |
| 6,483,562 | B1 | 11/2002 | Fukuyoshi et al. |
| 6,836,305 | B1 | 12/2004 | Kagawa et al. |
| 7,177,064 | B2 | 2/2007 | Park |

(Continued)

FOREIGN PATENT DOCUMENTS

EP 0445720 5/1991

(Continued)

OTHER PUBLICATIONS

Bonhote et al., Nanocrystalline electrochromic displays—Jan. 20, 1999.

(Continued)

*Primary Examiner*—David N Spector
(74) *Attorney, Agent, or Firm*—Volpe and Koenig, P.C.

(57) ABSTRACT

An electrochromic device in which specific channel direction for the conduction of ions is implemented. As a result ionic crosstalk between display pixels is greatly reduced and unwanted transient coloration effects are minimized. Further, specific gel, polymer, or ionic liquid solutions can greatly eliminate the corrosive effects associated with the use of electrolyte salt solutions.

20 Claims, 3 Drawing Sheets

U.S. PATENT DOCUMENTS

| | | |
|---|---|---|
| 2002/0176039 A1 | 11/2002 | Kanesada et al. |
| 2006/0256250 A1 | 11/2006 | Kameyama et al. |
| 2007/0002424 A1 | 1/2007 | Hirota et al. |
| 2007/0182705 A1 | 8/2007 | Leyland et al. |
| 2007/0182706 A1* | 8/2007 | Cassidy et al. .............. 345/107 |

FOREIGN PATENT DOCUMENTS

| | | |
|---|---|---|
| EP | 1271227 | 1/2003 |
| JP | 10010512 | 1/1998 |
| WO | WO03042753 | 5/2003 |
| WO | WO 2004/068231 | 8/2004 |
| WO | WO 2007082067 A2 * | 7/2007 |

OTHER PUBLICATIONS

Varsano et al., Ion Potential Diagrams as Guidelines for Stability and Performance of Electrochromic Devices.

Aliev et al., Image diffusion and cross-talk in passive matrix electrochromic displays—Displays 23 (2002) 239-247.

Corr et al., P-118: High Resolution Electrochromic Displays for E-Readers—750—SID 05 Digest.

Edwards et al., P-92: Electrochromic Passive-Matrix Displays—570—SID 03 Digest.

Lin et al., Effect of salt additive on the formation of microporous poly (vinylidene fluoride) membranes by phase inversion from LiClO4/Water/DMF/PVDF system—Polymer 44 (2003) 413-422.

Lin et al, Fine Structure of Poly (vinylidene fluoride) Membranes Prepared by Phase Inversion from a Water/N-Methyl-2-pyrollidone/Poly(vinylidene fluoride) System—J. Polym. Sci. Part B: Polymer Physics, vol. 42, 830-842 (2004).

* cited by examiner

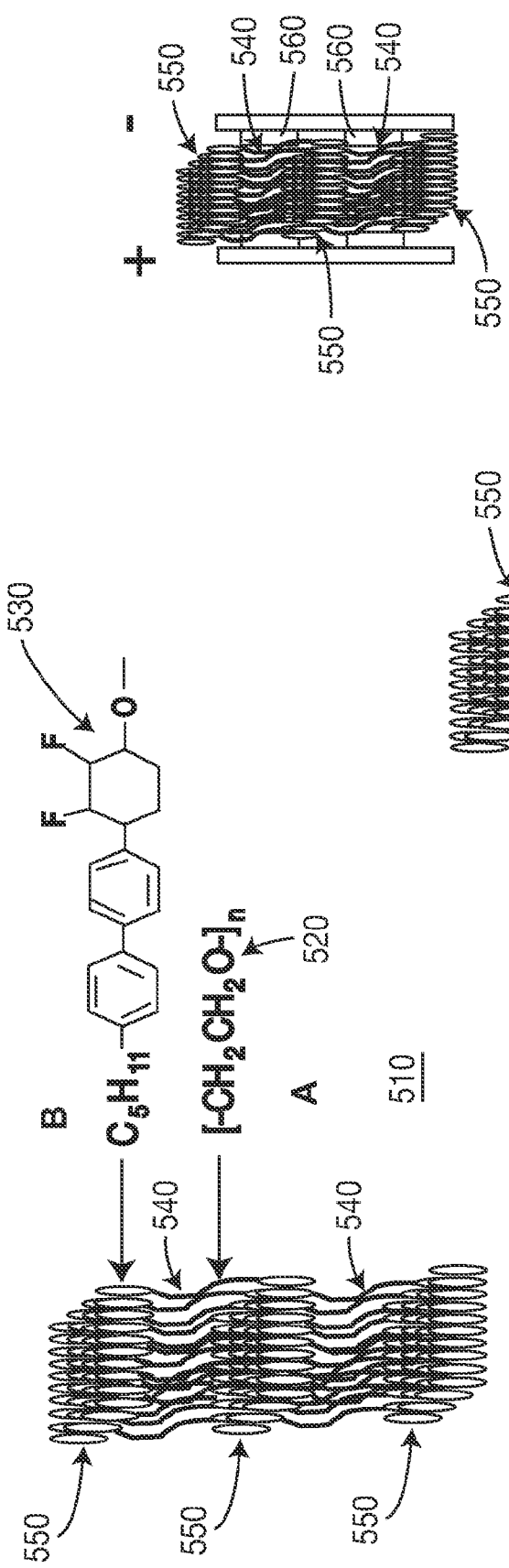
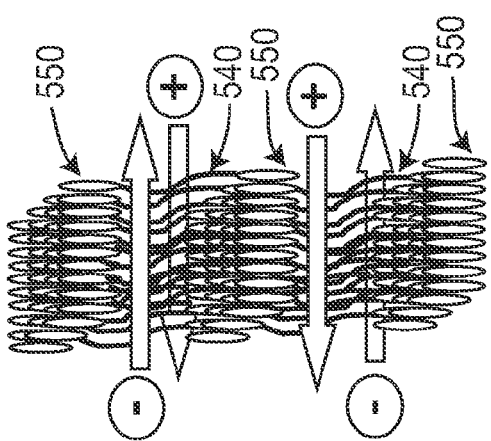
*FIG. 5a*
*FIG. 5b*
*FIG. 5c* ured metal oxide film with an absorbed chromophoric redox material. The second electrode includes a substrate, a conductor, and a second nanostructured metal oxide film. The anisotropically conducting electrolyte includes a polymer film and an electrolyte and the anisotropically conducting electrolyte is disposed between and operatively connecting the first and second electrodes. The control element is operatively connected to either the first or second electrodes and application of charge via the control element modulates the redox state of the chromophoric redox material.

ELECTROCHROMIC DEVICE EMPLOYING GEL OR SOLID POLYMERS HAVING SPECIFIC CHANNEL DIRECTION FOR THE CONDUCTION OF IONS

CROSS REFERENCE TO RELATED APPLICATION(S)

This application claims the benefit of U.S. Provisional Application Nos. 60/759,248; 60/759,256; 60/759,249; and 60/759,251; each of which were filed Jan. 13, 2006, and are incorporated by reference herein in their entirety as if fully set forth.

FIELD OF INVENTION

The invention relates to electrochromic devices and electrolyte compositions within electrochromic devices.

BACKGROUND

Electrochromic display devices operate by controlling the redox state of one or more chromophores contained within the device that change color depending on the redox state. These displays are bi-stable over many minutes or hours, only requiring power to update the screen and not to retain information. Electrochromic displays may be direct drive, passive matrix or active matrix devices.

In normal operation of any of these display classes, a voltage or current signal is applied to the device. This causes a change in the charge and hence the coloration of an addressed segment or pixel. In the example described in U.S. Pat. Nos. 6,301,038 and 6,870,657, both of which are incorporated by reference herein in their entirety as if fully set forth, a surface bound redox chromophore is reduced upon application of a negative potential. These devices contain an anode and cathode. In order to balance the charge state on one switching electrode, an electrolyte is provided that contains counter ions of opposite charge to the colored redox state of the chromophore in question. Normally, the counter ion will be free to move within the electrolyte in response to an applied potential. The anion, which provides charge compensation at the anode, and the cation which provides charge compensation at the cathode, move under the action of an emf between the two electrodes. Across two or more differentially charged segments or pixels, however, a potential difference may exist. The potential difference between segments or pixels may cause lateral movement of the charge compensating ions, and thus unwanted crosstalk between segments. Further, the slow equilibration of the counter electrode potential over time due to lateral ionic movement can cause unwanted transient coloration effects.

Crosstalk is commonly considered a risk in the case of passive or active matrix devices, where the pixels are addressed in a multiplexed manner and the pixels may be tightly spaced. Crosstalk is also a risk where the segments are tightly spaced in a fixed segment (direct drive) device. In addition, crosstalk may impact the bistable lifetime in any of the display classes. It is desirable for low-power operation and for enhanced image quality and grey-scale resolution to reduce this crosstalk effect.

SUMMARY

The invention herein relates to an electrochromic display that includes a first electrode, a second electrode, an anisotropically conducting electrolyte, and a control element. The first electrode includes a substrate, a patterned conductor, and a first nanostruct

BRIEF DESCRIPTION OF THE DRAWINGS

The following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown.

In the Drawings:

FIG. 5a illustrates a self-organizing anisotropic porous polymer matrix.

FIG. 5b illustrates an electrolyte and a self-organizing anisotropic porous polymer matrix.

FIG. 5c illustrates a self-organizing anisotropic porous polymer matrix within an electrochromic device.

DETAILED DESCRIPTION OF THE PREFERRED EMBODIMENTS

Figure 1:
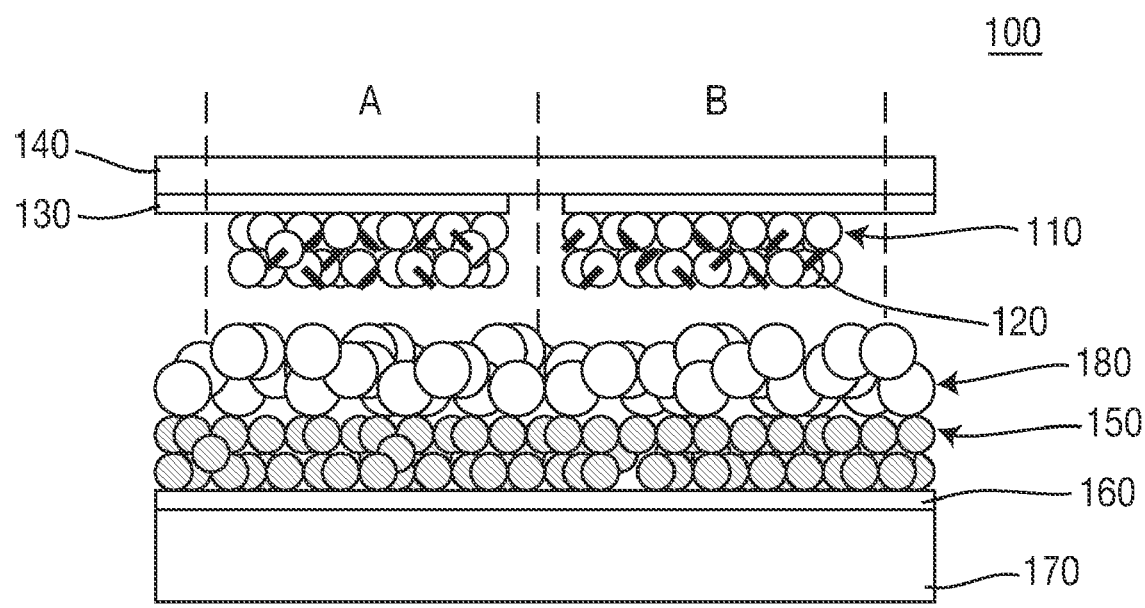
FIG. 1 illustrates a direct drive electrochromic display device.

Certain terminology is used in the following description for convenience only and is not limiting. The words "right," "left," "top," and "bottom" designate directions in the drawings to which reference is made.

As used herein, the phrase "operatively connected" means that two or more elements are connected to each other by function whether they are connected physically, directly, indirectly, chemically, or the like. For example, a chromophoric redox material is operatively connected to a control element even if it is not directly and physically attached to the control element if application of electrical charge, voltage, current or the like causes modulation of the chromophoric redox material.

As used herein, the phrase "control element" means any electrical element used to control a display device whether the display is a direct drive, passive, or active matrix display. Under this definition, control element includes, but is not limited to an electrode or a thin film transistor (TFT).

The words "a," "and," "one," as used in the claims and in the corresponding portions of the specification, are defined as including one or more of the referenced item unless specifically stated otherwise. This terminology includes the words above specifically mentioned, derivatives thereof, and words of similar import.

In electrochromic devices, ionic drift within the electrolyte can cause crosstalk in matrix devices and visible dynamic coloration gradients during the switching of direct-drive pixellated devices. These effects are caused by charge leakage along the electric field resulting from the potential difference between the segment (SEG) pixel that has been colored and a common (COM) electrode that is not exactly congruent with it.

A direct-drive electrochromic display 100 is illustrated in FIG. 1. In the embodiment illustrated, the device is based on nanostructured film 110 with adsorbed chromophoric redox material 120 residing on a first substantially transparent conductor 130. The first conductor 130, in turn, resides on a substrate 140. The nanostructure film 110 includes a metal oxide. A second nanostructured film 150, also including a metal oxide, is located on a second conductor 160 that is located on a second substrate 170. An image is typically created by modulating the redox state of the chromophoric redox material 120, and, thus, the light that passes through a controlled segmented pixel-area of the first nanostructured film 110. In preferred embodiments, the first nanostructured film 110 includes $TiO_2$ and the chromophoric redox material is a viologen. Also in preferred embodiments, the second nanostructured film 150 is $SnO_2$:Sb (ATO), $In_2O_3$:Sn (ITO) or $SnO_2$:F (FTO).

Often layers 110-140 define a cathode, and layers 150-170 define an anode. Control is imparted by applying voltage or current through the device, and electrical connection is provided by an electrolyte provided between electrode layers 110-140 and 150-170. The voltage or current applied through the device changes the redox state, and hence the color, of the adsorbed chromophoric materials 120. Light is, thus, absorbed or allowed to pass. When light is absorbed, the pixel-area may appear dark. In contrast, light that passes may be reflected off an ion-permeable white reflective layer 180. The voltage or current to control each pixel is provided by an individual routing track to the conductor 160 and conductor 160 is often a nominally transparent material such as indium doped titanium oxide (ITO). In electrochromic devices, whether direct drive, passive matrix, or active matrix, there is often a common (COM) electrode and a segment (SEG) electrode or pixel. In the device illustrated in FIG. 1, the COM electrode may be the electrode layers 150-170, while areas A and B of layers 110-140 may define separate SEG pixels.

Figure 2:
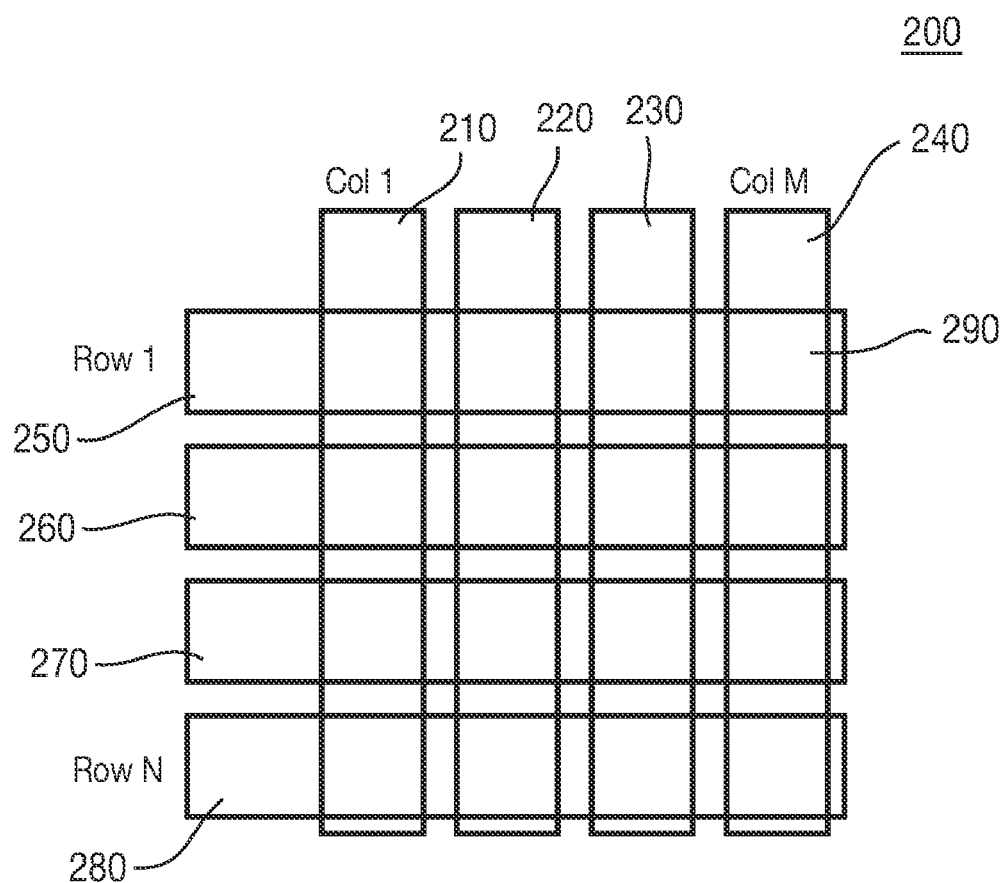
FIG. 2 illustrates a schematic view of a passive matrix electrochromic display device.

Referring to FIG. 2, an embodiment is illustrated with a passive matrix device 200 where a similar layer structure may be used. In this case, the two electrode layers are patterned into two sets of opposing orthogonal electrodes, normally denoted column 210-240 and row 250-280 electrodes. The individual areas where column 210-240 and row 250-280 electrodes overlap define switchable pixel areas; such as the switchable pixel area 290. In order to complete the circuit, an electrolyte is provided between the two electrode layers.

Figure 3:
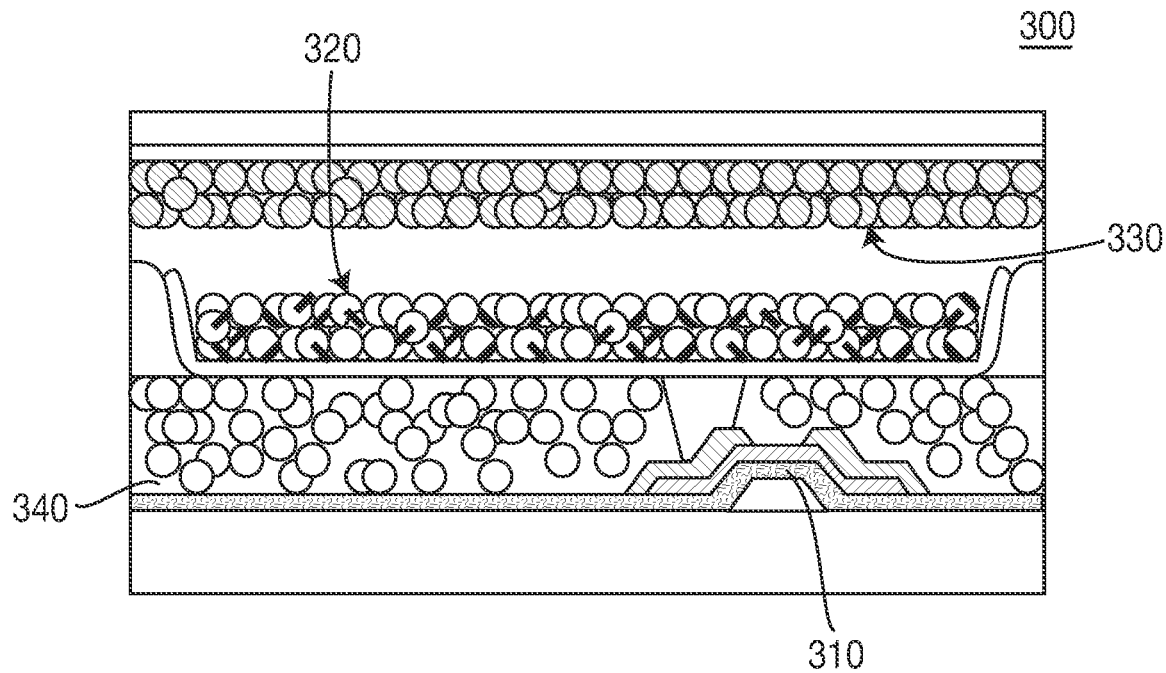
FIG. 3 illustrates a cross-sectional view of an active-matrix electrochromic display device.

Referring to FIG. 3, an embodiment is illustrated with an active-matrix display 300 where each pixel has an active device 310 which allows electrical isolation of that pixel. Such an arrangement enables matrix/multiplexed addressing of the large number and high density of pixels. The active element 310 is typically a Thin Film Transistor (TFT). The construction of the TFT from opaque metal layers means that it is non-transparent. Additionally, the drain of the TFT must be connected to the cathode (in some embodiments, a nanostructured $TiO_2$ film) of the electrochromic cell and the switching element must be on the same substrate as the cathode electrode. Although a similar layer structure may be used as for the direct-drive implementation (as illustrated in FIG. 1), it is desirable to invert the relative positions of the cathode (electrode layers 110-140 in FIG. 1) and anode (electrode layers 150-170 in FIG. 1) with respect to the viewer and to have a transparent anode layer 330. This inverted structure may be used in the passive or active matrix environment. In the embodiments illustrated in FIGS. 1 and 3, the viewer is above the device. In the device illustrated in FIG. 3, a reflector layer 340 is underneath the cathode 320 which is a patterned cathode. As with the direct drive and passive matrix devices, an electrolyte is disposed between the cathode 320 and anode 330 layers.

Direct drive, passive matrix and active matrix electrochromic devices are further described in U.S. application Ser. No. 11/536,316, which is incorporated by reference herein in its entirety as if fully set forth.

There are at least two crosstalk issues in passive matrix displays. First, orthogonal crosstalk occurs as the charge distribution in the electrolyte equilibrates and the charge, and hence the color, bleeds from the pixel initially colored. As the charge and color bleeds, all of the pixels along the row with which the colored SEG pixel shares a common connection may become colored. Second, slow lateral ion diffusion in the electrolyte, parallel to the plane of the electrode may cause the effective potential difference between a colored pixel and the section of the COM electrode opposite to the colored pixel to shift over time. This second effect is caused by the charge equilibration rate in the COM electrode and is limited by slow lateral ion diffusion in the electrolyte.

If the ionic mobility of the electrolyte is restricted to one dimension, that is perpendicular to the electrode surfaces, these dynamic coloration gradients are suppressed. In the case of the passive matrix displays, this is achieved by the complete, or near-complete ionic isolation of a pixel row from all of the COM columns except the one corresponding to the driven pixel. In the case of the dynamic coloration effect seen in direct-drive devices, it is achieved by eliminating the lateral ionic component of charge equilibration in the COM electrode. In the case of active matrix devices, the isolation is primarily achieved by the active device, however, suppression of ionic crosstalk can reduce the drain-source bias of the addressing transistor and thus further reduce leakage currents.

Embodiments of the present invention include an electrolyte incorporated in an anisotropic porous polymer matrix. In preferred embodiments, the anisotropic porous polymer matrix is self assembling. As used herein, the combination of an electrolyte and an anisotropic porous polymer matrix may be referred to as an anisotropically conducting electrolyte. The anisotropic porous polymer suppresses lateral charge transfer and controls or eliminates crosstalk in matrix-driven displays and dynamic transient coloration effects in matrix-driven and direct-driven displays.

Figure 4:
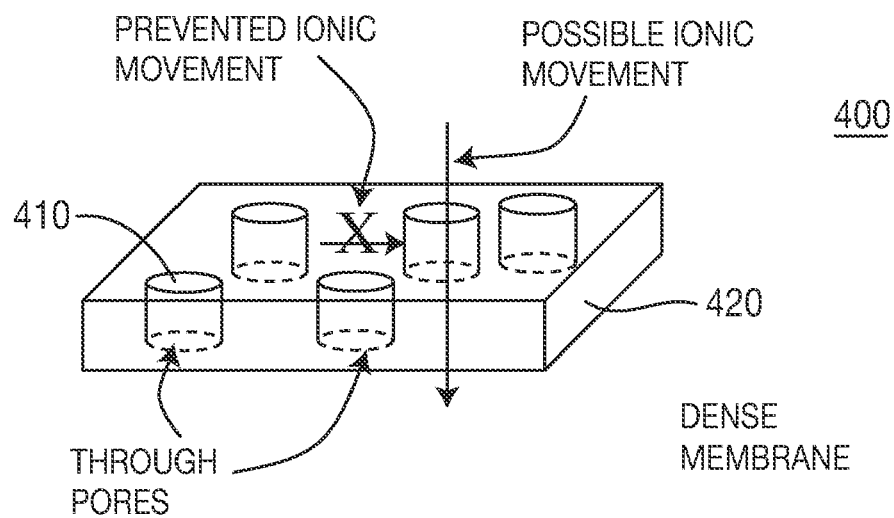
FIG. 4 illustrates a polymer film.

Referring to FIG. 4, embodiments of the present invention include using an electrolyte comprising a polymer film 400 swollen with liquid electrolyte, containing pores 410 aligned perpendicular to the polymer film 400 plane. The pores 410 are also perpendicular to the COM and SEG nanostructured electrode films (not shown). These pores 410 contain the liquid electrolyte, comprising either a solution of an ionic compound or an ionic liquid. In preferred embodiments, the matrix 420 of the polymer film consists of a dense or predominantly dense polymer. Ions within the polymer matrix 420 are immobile or have mobility much lower than they would in the liquid of the pores 410. Because of this reduced mobility in the matrix 420, the film 400 is an embodiment of an anisotropic porous polymer matrix. In addition, the combination of the polymer film 400 and an electrolyte is an embodiment of an anisotropically conducting electrolyte.

In an embodiment, the polymer film is prepared by precipitation. To prepare a film by precipitation, the polymer is dissolved in a carrier solvent. A wet film of the solution is then immersed in a second solvent. The polymer is insoluble in the second solvent, but the carrier solvent is miscible in the second solvent. As the two solvents mix, a phase inversion takes place in which the polymer solution, containing discrete polymer molecules in a continuous solvent phase; is replaced by a continuous polymer film. The mixed solvents are dispersed in discrete pores. The film can then be removed from the solvent bath, dried, and the carrier and second solvents (working solvents) replaced with an electrolyte by soaking the film in the electrolyte.

By controlling the composition of the working solvents, the morphology of the pores contained in the film may be controlled. A composition is chosen that results in the formation of columnar pores, running perpendicular to the plane of the film and extending through its thickness, surrounded by a dense or near-dense polymer.

In an embodiment, polymers include, but are not restricted to poly (vinylidene fluoride) (PVDF), copolymers of vinylidene fluoride and hexafluoropropylene, poly (ethylene oxide), poly (vinyl alcohol), ethylcellulose, hydroxypropyl-cellulose, nitrocellulose, and poly (methylmethacrylate). Suitable solvents for the polymer include, but are not restricted to N-methylpyrrolidinone, acetone, gamma-butyrolactone, methoxypropionitrile, dimethylformamide, dimethylacetamide, alcohols, and glycol ethers or solutions of ionic compounds in these solvents, and mixtures thereof. Finally, suitable solvents for the electrolyte include, but are not restricted to gamma-butyrolactone, and methoxypropionitrile, and mixtures thereof.

In a preferred embodiment, where PVDF is the polymer the preferred carrier solvent is dimethylformamide containing 1% to 9% lithium perchlorate by weight, and the preferred second solvent is water. An alternate preferred carrier solvent is N-methyl pyrrolidinone and the alternate preferred second solvent is water.

In another embodiment, the film is prepared by solidification. To prepare a film by solidification, a melt is prepared by melting a mixture of two polymers or a polymer and a non-polymeric organic compound that are mutually soluble in the liquid phase and mutually insoluble or only sparingly soluble in the solid state. In a preferred embodiment, materials that form a eutectic system are chosen to form a polymer film by solidification.

Two-phase solids may form in a wide range of morphologies, depending on the crystal structures of the two solid components, their interfacial energy, the presence of suitable nucleation sites in the melt or its containing vessel, and the thermal profile of the material during solidification. In an embodiment, components used to make a polymer film by solidification are chosen in which the solid state consists of a continuous phase in a porous matrix in which the second phase is dispersed in rods or columns that do not touch or intersect.

In an embodiment, the material is cooled below the solidus temperature, and the non-continuous phase is removed by chemical dissolution. An electrolyte, consisting of an ionic material in liquid solution or an ionic liquid is introduced into the material by soaking or infiltration.

In another embodiment, the components are chosen such that the first phase to solidify is the continuous one. The material is then maintained at a temperature above the liquidus, but below the solidus for that composition, so that the material remains in the two-phase region of the phase diagram. The discontinuous liquid is then removed by washing with a solvent with which it is miscible, but in which the continuous phase is insoluble. The electrolyte, consisting of an ionic material in liquid solution, or an ionic liquid, is introduced into the material by soaking or infiltration, as above.

In yet another embodiment, the components are chosen such that the first phase to solidify is the continuous one and the second component is an ionic material in liquid solution, or an ionic liquid. The second component is chosen to have a freezing point below the lower of the minimum operational or storage temperature of the device in which the electrolyte is to be used, thus maintaining the entire electrolyte system above the solidus temperature and in the two-phase region of the phase diagram. The second, liquid phase forms the electrolyte in the porous solid film. In this embodiment, the melt may be introduced into the display device and part-frozen, as above, in situ. In this case, the surfaces of the display electrodes may be used to provide nucleation sites for the growth of the solid phase, promoting columnar orientation of the structure, aligned perpendicular to the electrode planes.

Lin et al. reported the formation of anisotropically structured porous polymer films by phase inversion (Journal of Polymer Science B, 42, 5, pp 830-842 (2004) and Lin et al (Polymer 44 pp 412-422, (2003)). Likewise, Castro and Josefiak et al. describe the formation of anisotropically structured porous polymer films from melts (U.S. Pat. Nos. 4,247,498 and 4,666,607, respectively). Each Lin et al. reference, Castro, and Josefiak et al are incorporated by reference herein in their entirety as if fully set forth. However, Lin et al., Castro and Josefiak et al. did not contemplate the use of polymer films in display devices.

Referring to FIG. 5a, another embodiment is illustrated where a polymer film 510 is composed of a polymer 520 joined by a linker 530. In the embodiment illustrated, the polymer 520 and linker 530 moieties are chemical moieties that may be bound to other moieties to form larger compounds. The polymer film 510 is formed by self-assembly of the polymer 520 and linker 530 moieties. In the embodiment illustrated, polymer and linker moieties 520, 530 bind to each other to form chains of alternating polymer 520 and linker 530. One polymer moiety 520 from one chain stacks with the polymer moiety 520 of another chain. Similarly, the linker moiety 530 from one chain stacks with the linker 530 of another chain. The stacked polymer moieties 520 form polymer sections 540, and the stacked linker moieties 530 form linker sections 550. The polymer sections 540 support ion conductivity but the linker sections 550 do not. Schematically, this is represented in FIG. 5b where charge flows through polymer sections 540. As illustrated polymer film 510 is an embodiment of an anisotropic polymer matrix. Further, the combination of polymer film 510 and an electrolyte is another embodiment of an anisotropically conducting electrolyte.

The embodiment depicted in FIG. 5a includes a specific polymer 520 and linker 530. However, polymer 520 can be any suitable polymer that will bond with the linker and form a charge flow path. In one embodiment, the polymer is a polyethylene. Likewise, the linker 530 can be any suitable linker that will bond with the polymer and inhibit charge flow.

FIG. 5c shows how such a polymer film 510 arrangement might be employed in an electrochromic display device. As illustrated, the polymer and linker sections 540, 550 are arranged perpendicular to pixel electrode 560. The arrangement illustrated has one polymer section 540 aligned with one electrode 560. However, several polymer-linker sections may overlap one pixel electrode 560.

The material typically used for the electrolyte in an electrochromic display is a solvent with a dissolved salt. Suitable solvents are water or organic solvents such as acetonitrile, propylene carbonate, gamma-butyrolactone and other solvents known in the art. Suitable salts are lithium, sodium or ammonium salts.

In another embodiment, an electrochromic display is protected from the effects of the electrolyte. Because of their ionic character, electrolytes can cause corrosion and affect the performance of active-matrix circuits or high conductivity electrodes in passive or direct-drive displays. Gel or polymer components may be included in an electrolyte system in an electrochromic device to minimize effects of a corrosive electrolyte. A gel in this embodiment may be comprised of a mixture one of the polymers disclosed above and a liquid. In a preferred embodiment, the gel or polymer that minimizes the corrosive effects of the electrolyte includes PVDF. In addition to gel or polymers, suitable ionic liquids may be used to minimize corrosive effects. Preferable ionic liquids include, but are not limited to Ethanolammonium formate, 1-Ethyl-3-methyl-imidazolium dicyanamide, 1-Ethyl-3-methyl-imidazolium methanesulfonate, 1-Ethyl-3-methyl-imidazolium nitrate, 1-Ethyl-3-methyl-imidazolium tetrafluoroborate, 1-Ethyl-3-methyl-imidazolium ethylsulfate, 1-Butyl-3-methyl-imidazolium bromide, Ethylammonium nitrate, Trihexyltetradecylphosphonium decanoate, and Tri-isobutylmethylphosphonium tosylate. Further ionic liquids suitable for these embodiments include Butylmethylpyrrolidinium bis(trifluoromethylsulfonyl)imide, 1-Ethyl-3-methylimidazolium chloride, 1-Ethyl-3-methylimidazolium trifuoromethanesulfonate, 1-Butyl-3-methylimidazolium trifluoromethanesulfonate, 1-Ethyl-3-methylimidazolium chloride, 1-Ethyl-3-methylimidazolium chloride, 1-Ethyl-3-methylimidazolium bromide, 1-Butyl-3-methylimidazolium chloride, 1-Butyl-3-methylimidazolium bromide, 1-Hexyl-3-methylimidazolium chloride, 1-Hexyl-3-methylimidazolium bromide, 1-Methyl-3-octylimidazolium chloride, 1-Methyl-3-octylimidazolium bromide, 1-Propyl-3-methylimidazolium iodide, 1-Butyl-2,3-dimethylimidazolium chloride, 1-Ethyl-3-methylimidazolium tetrafluoroborate, 1-Ethyl-3-methylimidazolium hexafluorophospate, 1-Ethyl-3-methylimidazolium dicyanamide, 1-Ethyl-3-methylimidazolium trifuoromethanesulfonate, 1-Ethyl-3-methylimidazolium methanesulfonate, 1-Butyl-3-methylimidazolium tetrafluoroborate, 1-Butyl-3-methylimidazolium hexafluorophosphate, 1-Butyl-3-methylimidazolium hexafluorophosphate, 1-Butyl-3-methylimidazolium trifuoromethanesulfonate, 1-Butyl-3-methylimidazolium methanesulfonate, 1-Hexyl-3-methylimidazolium tetrafluoroborate, 1-Hexyl-3-methylimidazolium hexafluorophosphate, 1-Methyl-3-octylimidazolium tetrafluoroborate, 1-Methyl-3-octylimidazolium hexafluorophosphate, 1-Butyl-2,3-dimethylimidazolium tetrafluoroborate, 1-Butyl-2,3-dimethylimidazolium hexafluorophosphate, Cyclohexyltrimethylammonium bis(trifluormethylsulfonyl)imide, bis(trifluoromethylsulfonyl)imide, ECOENG™ 418, (2-Hydroxyethyl) trimethylammonium dimethylphosphate, 1-Ethyl-3-methylimidazolium tosylate, ECOENG™ 41M, ECOENG™ 21M, 1-Butyl-4-methylpyridinium bromide, 1-Butyl-3-methylpyridinium bromide, 1-Butyl-3-methylpyridinium tetrafluoroborate, 1-Butyl-4-methylpyridinium tetrafluoroborate, 1-Butyl-4-methylpyridinium hexafluorophosphate, 1-Butyl-3-methylpyridinium hexafluorophosphate, 1-Ethyl-3-hydroxymethylpyridinium ethylsulfate, 1-Ethyl-3-methylpyridinium ethylsulfate, 1-Ethyl-3-methylpyridinium nonaflate, 1-Butyl-3-methylpyridinium dicyanamide, 1-Metyl-3-octylpyridinium tetrafluoroborate, Triethylsulfonium bis(triflouromethylsulfonyl)imide, Butylmethylpyrrolidinium bis(trifluoromethylsulfonyl)imide, ECOENG™ 411, ECOENG™ 212, and ECOENG™ 214. These gel, polymer or ionic liquid compositions, alone or in combinations thereof, may be used in further combination with the previously described methods for anisotropic conduction.

It is understood, therefore, that this invention is not limited to the particular embodiments disclosed, but is intended to cover all modifications which are within the spirit and scope of the invention as defined by the appended claims; the above description; and/or shown in the attached drawings.

What is claimed is:

1. An electrochromic display comprising a first electrode, a second electrode, an anisotropically conducting electrolyte, and a control element;
    the first electrode including a substrate, a patterned conductor, and a first nanostructured metal oxide film with an adsorbed chromophoric redox material;
    the second electrode including a substrate, a conductor, and a second nanostructured metal oxide film;
    the anisotropically conducting electrolyte including a polymer film and an electrolyte, the anisotropically conducting electrolyte is disposed between and operatively connects the first and second electrodes;
    the control element operatively connected to either the first or second electrodes and application of voltage or current via the control element modulates the redox state of the chromophoric redox material.

2. The electrochromic display of claim 1, the control element is a direct drive.

3. The electrochromic display of claim 1, the control element is a passive matrix where the first and second electrodes are arranged in orthogonal columns and rows; the overlapping regions where the columns and rows overlap defining switchable pixel areas; and application of voltage or current via the control element to a particular column and a particular row modulates the redox state of the chromophoric material in the switchable pixel area where the particular column and the particular row overlap.

4. The electrochromic display of claim 1, the control element is an active matrix control element.

5. The electrochromic device of claim 4, the active matrix control element is a thin film transistor.

6. The electrochromic device of claim 1, the polymer film including an anisotropic polymer matrix, pores, and the electrolyte is within the pores; the pores aligned perpendicularly to the first and second electrodes.

7. The electrochromic device of claim 6, the anisotropic polymer matrix is self-assembling.

8. The electrochromic device of claim 6, the anisotropic polymer matrix is formed by precipitation from working solvents.

9. The electrochromic device of claim 8, the working solvents selected from the group consisting of N-methylpyrrolidinone, acetone, gamma-butyrolactone, methoxypropionitrile, dimethylformamide, dimethylacetamide, alcohols, and glycol ethers.

10. The electrochromic device of claim 6, the anisotropic polymer matrix is formed by solidification.

11. The electrochromic device of claim 6, the anisotropic polymer matrix including a polymer selected from the group consisting of poly (vinylidene fluoride), copolymers of vinylidene fluoride and hexafluoropropylene, poly (ethylene oxide), poly (vinyl alcohol), ethylcellulose, hydroxypropylcellulose, nitrocellulose, and poly (methylmethacrylate).

12. The electrochromic device of claim 6, the electrolyte is selected from the group consisting of a solution of an ionic compound and an ionic liquid.

13. The electrochromic device of claim 6, the electrolyte is selected from the group consisting of gamma-butyrolactone, and methoxypropionitrile.

14. The electrochromic device of claim 1, the anisotropically conducting electrolyte including a polymer film that is self assembling from polymer and linker moieties; the polymer and linker moieties bind to each other to each other to form chains; the polymer of one chain associating with polymer of another chain to form a polymer section; the linker of one chain associating with the linker of another chain to form a linker section; and the polymer and linker sections are arranged perpendicularly to the first and second electrodes.

15. The electrochromic device of claim 14, the polymer sections supporting ion conductivity and the linker sections do not support ion conductivity.

16. The electrochromic device of claim 14, the polymer includes polyethylene.

17. The electrochromic device of claim 14, the linker moiety includes a chemical moiety of the formula

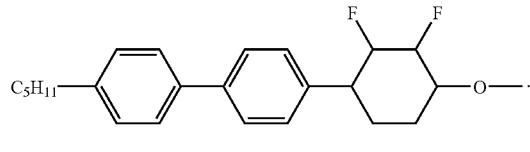

18. The electrochromic device of claim 1, the electrolyte is a solvent with a dissolved salt.

19. The electrochromic device of claim 18, the solvent is selected from the group consisting of acetonitrile, propylene carbonate, and gamma-butyrolactone.

20. The electrochromic device of claim 18, the salt selected from the group consisting of lithium, sodium and ammonium salts.

\* \* \* \* \*

UNITED STATES PATENT AND TRADEMARK OFFICE
CERTIFICATE OF CORRECTION

PATENT NO. : 7,403,319 B2  
APPLICATION NO. : 11/622751  
DATED : July 22, 2008  
INVENTOR(S) : Leyland et al.

Page 1 of 1

It is certified that error appears in the above-identified patent and that said Letters Patent is hereby corrected as shown below:

At column 9, line 10, after "moieties bind" delete the first instance of "to each other".

Signed and Sealed this

Sixteenth Day of December, 2008

JON W. DUDAS  
*Director of the United States Patent and Trademark Office*